United States Patent
Chen et al.

(10) Patent No.: US 9,689,683 B2
(45) Date of Patent: Jun. 27, 2017

(54) MAGNETIC POSITIONING DEVICE

(71) Applicants: Wei-Tung Chen, Taipei (TW); Yu Hsin Wang, Taichung (TW)

(72) Inventors: Wei-Tung Chen, Taipei (TW); Yu Hsin Wang, Taichung (TW)

( * ) Notice: Subject to any disclaimer, the term of this patent is extended or adjusted under 35 U.S.C. 154(b) by 45 days.

(21) Appl. No.: 14/947,553

(22) Filed: Nov. 20, 2015

(65) Prior Publication Data

US 2016/0231140 A1    Aug. 11, 2016

(30) Foreign Application Priority Data

Feb. 5, 2015    (TW) .............................. 104103966 A

(51) Int. Cl.
| | | |
|---|---|---|
| G01B 7/14 | (2006.01) | |
| G01B 7/30 | (2006.01) | |
| G01C 21/08 | (2006.01) | |
| G01C 21/20 | (2006.01) | |
| G01C 21/04 | (2006.01) | |

(52) U.S. Cl.
CPC .................................. G01C 21/04 (2013.01)

(58) Field of Classification Search
CPC .................................. G01B 7/14; G01C 21/08
USPC ....................................... 324/207.15, 207.22
See application file for complete search history.

(56) References Cited

U.S. PATENT DOCUMENTS

| | | | | |
|---|---|---|---|---|
| 2008/0266695 | A1* | 10/2008 | Handa ............................ | 360/43 |
| 2013/0176401 | A1 | 7/2013 | Monari et al. | |
| 2014/0229103 | A1 | 8/2014 | Mirov et al. | |

FOREIGN PATENT DOCUMENTS

| | | |
|---|---|---|
| CN | 103926582 A | 7/2014 |
| TW | 343329 | 10/1998 |
| TW | 200526976 A | 11/2005 |

* cited by examiner

Primary Examiner — Bot Ledynh
(74) Attorney, Agent, or Firm — WPAT, PC

(57) ABSTRACT

A magnetic positioning device includes a magnetic scanning unit and a magnetic sensing unit. The magnetic scanning unit is for forming a first magnetic surface and a second magnetic surface. The first magnetic surface and second magnetic surface rotatably form a detection space. The magnetic sensing unit is disposed in the detection space for recording a first time point and a second time point. The magnetic sensing unit is in contact to the first magnetic surface at the first time point and defines a first-angle data. The magnetic sensing unit is in contact to the second magnetic surface at the second time point and defines a second-angle data. The first-angle data and the second-angle data define a location data of the magnetic sensing unit in the detection space with respect to the magnetic scanning unit, wherein the first time point is not the same as the second time point.

16 Claims, 4 Drawing Sheets

MAGNETIC POSITIONING DEVICE

FIELD OF THE INVENTION

The present invention relates to a positioning device, particularly to a magnetic positioning device.

BACKGROUND OF THE INVENTION

Cell phones are commonly used as positioning devices for home or small-range applications. The cell phones mainly relate to terminal cell phone modules, wireless data communication modules, and global positioning modules (i.e. GPS). When a terminal cell phone module is connected to a mobile communication network, and the wireless data communication module is connected to the Internet, the global positioning module can receive positioning signals from satellites, thereby allowing the cell phone to transmit a position data to a control center through the mobile communication network or the Internet for operation.

However, even though cell phones can receive positioning signals from satellites for positioning, signals from satellites are easily affected by weather and terrains. When a user is inside a building or other locations which blocks signals, the GPS is particularly inaccurate. Moreover, mobile communication network is restricted to locations where base stations are set by telecommunication companies, and the Internet is limited to locations with access thereto. Therefore, when a user intends to use a cell phone for positioning in a home or office, restrictions often affect the positioning and create inconvenience.

SUMMARY OF THE INVENTION

The present invention provides a magnetic positioning device having a higher positioning accuracy.

According to an embodiment of the present disclosure, a magnetic positioning device includes a magnetic scanning unit and a magnetic sensing unit. The magnetic scanning unit is for forming a first magnetic surface and a second magnetic surface. The first magnetic surface rotates about a first rotation axis. The second magnetic surface rotates about a second rotation axis. The first rotation axis and the second rotation axis intersect. Rotations of the first magnetic surface and the second magnetic surface define a detection space. The magnetic sensing unit is disposed in the detection space and is connected to a sample, for recording a first time point when contacting the first magnetic surface and a second time point when contacting the second magnetic surface, thereby respectively obtaining a first-angle data and a second-angle data, and defining the location data of the magnetic sensing unit in the detection space with respect to the magnetic scanning unit.

In another embodiment of the present disclosure, the first magnetic surface has a first scanning radius, and the second magnetic surface has a second scanning radius. The magnetic sensing unit defines a position signal according to the first-angle data, the second-angle data, and a detected strength of a magnetic field of the first magnetic surface and the second magnetic surface.

In an embodiment of the present disclosure, the first rotation axis and the second rotation axis are perpendicular to each other.

In an embodiment of the present disclosure, the first magnetic face and the second magnetic face are planes perpendicular to the rotation axis and are planes including the strongest portion of a magnetic field created by the magnetic scanning unit.

In an embodiment of the present disclosure, the magnetic scanning unit is for forming the second magnetic surface after the magnetic sensing unit defines the first-angle data.

In an embodiment of the present disclosure, when the first magnetic surface rotates and a magnetic field strength detected by the magnetic sensing unit is the greatest value of the magnetic field strength emitted by the magnetic scanning unit, define this time as the first time point of the magnetic sensing unit (phase data). When the second magnetic surface rotates and a magnetic field strength detected by the magnetic sensing unit is the greatest value of the magnetic field strength emitted by the magnetic scanning unit, define this time as the second time point of the magnetic sensing unit. The first-angle data and the second-angle data are obtained according to the first time point and the second time point, respectively.

In an embodiment of the present disclosure, the first magnetic surface and the second magnetic surface uses frequency division multiplexing to avoid interference therebetween. Alternately, the first magnetic surface and the second magnetic surface can use time division multiplexing to avoid interference therebetween.

In an embodiment of the present disclosure, the magnetic scanner unit is a rotating magnet or a biaxial orthogonal coil.

According to another embodiment of the present disclosure, a magnetic positioning device includes a first magnetic scanning unit, a second magnetic scanning unit, a third magnetic scanning unit and a magnetic sensing unit. The first magnetic scanning unit is for forming a scanning space of a first magnetic surface. The first magnetic surface rotates about a first rotation axis. The second scanning unit is for forming a scanning space of a second magnetic surface. The second magnetic surface rotates about a second rotation axis. The third magnetic scanning unit is for forming a scanning space of a third magnetic surface. The third magnetic surface rotates about a third rotation axis. The rotations of the first magnetic surface, the second magnetic surface and the third magnetic surface define a detection space. The magnetic sensing unit is disposed in the detection space and is connected to a sample, for recording a first time point when contacting the first magnetic surface, a second time point when contacting the second magnetic surface and a third time point when contacting the third magnetic surface, thereby respectively obtaining a first-angle data, a second-angle data and a third-angle data, and defining the location data of the magnetic sensing unit in the detection space with respect to the first magnetic scanning unit, the second magnetic scanning unit and the third magnetic scanning unit.

In an embodiment of the present disclosure, at least two of the first rotation axis, the second rotation axis and the third rotation axis are not parallel.

In an embodiment of the present disclosure, magnetic field strengths of the first magnetic surface, the second magnetic surface and the third magnetic surface respectively include the greatest value of magnetic field strengths emitted by the first magnetic scanning unit, the second magnetic scanning unit and the third magnetic scanning unit, respectively.

In an embodiment of the present disclosure, the first magnetic surface, the second magnetic surface and the third magnetic surface uses frequency division multiplexing to avoid interference therebetween. Alternately, the first magnetic surface and the second magnetic surface can use time division multiplexing to avoid interference therebetween.

In an embodiment of the present disclosure, the detection space is a region overlapped by rotations of the first magnetic surface, the second magnetic surface and the third magnetic surface.

In an embodiment of the present disclosure, at least one of the first magnetic scanning unit, the second magnetic scanning unit and the third magnetic scanning unit is a rotating magnet or a biaxial orthogonal coil.

The magnetic positioning device of the present embodiment can use a magnetic scanning unit to construct a detection space, and dispose a magnetic sensing unit on a sample in the detection space, and calculate the angle (phase) data related to location through detection of the magnetic sensing unit and analysis of changing magnetic field emitted by the magnetic scanning unit, to define the spatial position relationship of the sample in the sample in the detection space. Since the magnetic positioning device of the present embodiment can detect and define the detection space and position of the sample by detecting the magnetic field strength of the magnetic field, the magnetic positioning device has better accuracy compared to typical wireless positioning methods.

The system needs a time reference to define the time arrival of scanning magnetic field scanning. Because the position is defined by time, the devices in the system need synchronization. The system generates an additional reference signal in the same source that is the coils. The reference signal is embedded in the same source. The reference signal is one frequency signal that is the different frequency than the scanning signal in the concept of frequency domain division too. The reference signal can be driven by one or two or three coils. If the signal is driven by multiple coils, the signals in different coils are in-phase that means there will not cause rotating field. The time delay from coil to object of reference signal will only vary with distance and will not vary with the position angle as compared with rotating signal.

The object have different time delay (first time) corresponding to its position angle from the source. As in the same distance from the source, the reference signal, that is stable with position angle, can provide a fixed time reference for the rotating signal. Therefore, we can define the time point using the relation (time difference) between the reference signal and the rotating signal for the first time point and second time point.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1A:
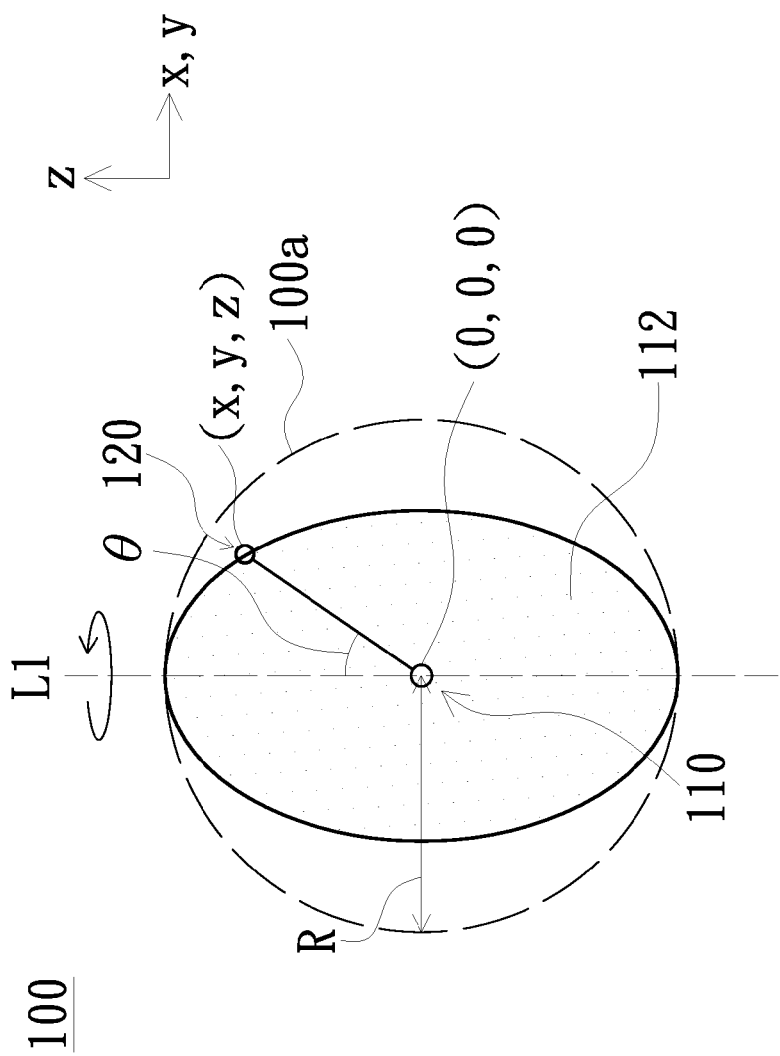
FIG. 1A shows a schematic diagram of a magnetic positioning device according to an embodiment of the present disclosure.
Figure 1B:
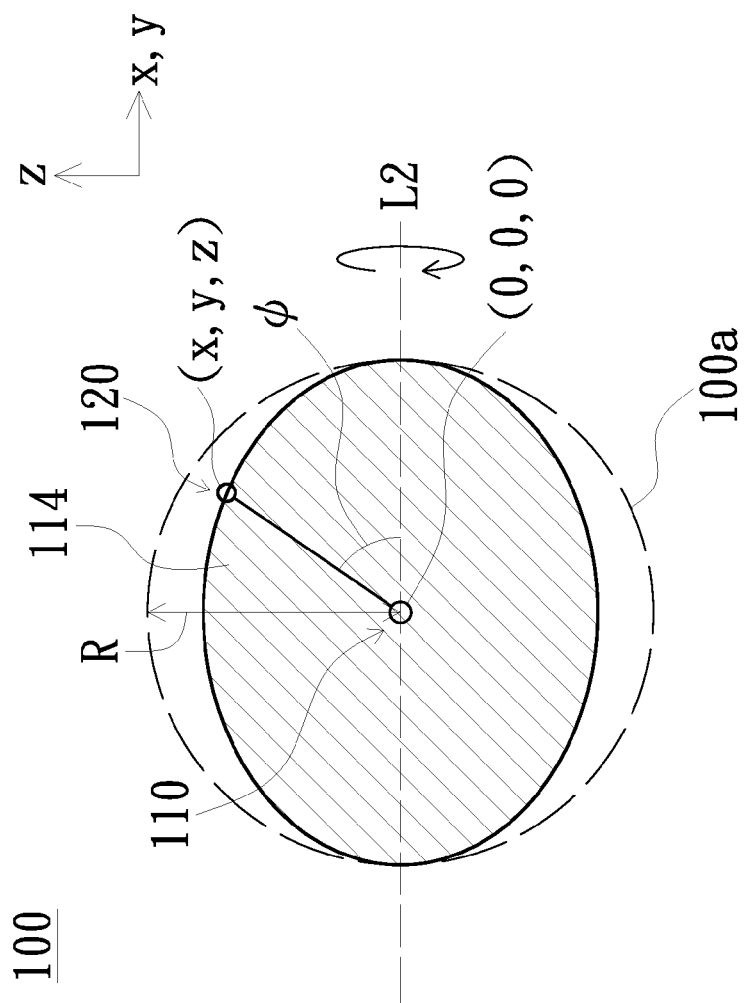
FIG. 1B shows a schematic diagram of a magnetic positioning device according to an embodiment of the present disclosure.

FIG. 1A and FIG. 1B are schematic diagrams of a magnetic positioning device according to an embodiment of the present disclosure. As shown in FIG. 1A and FIG. 1B, a magnetic positioning device 100 of the present embodiment includes a magnetic scanning unit 110 and a magnetic sensing unit 120.

The magnetic scanning unit 110 is for forming a first magnetic surface 112 and a second magnetic surface 114. The first magnetic surface 112 rotates about a first rotation axis L1 (as shown in FIG. 1A). The second magnetic surface 114 rotates about a second rotation axis L2 (as shown in FIG. 1B). In the present embodiment, the magnetic scanning unit 110 can be a rotating magnet or biaxial orthogonal coil, and can produce a rotatable magnetic field having a particular field shape. It should be understood that the first magnetic surface 112 or the second magnetic surface 114 is a magnetic surface including the rotation axis and the greatest magnetic field strength defined in the magnetic field. For example, the magnetic field strength of the first magnetic surface 112 or the second magnetic surface 114 include the greatest value of the magnetic field strength emitted by the magnetic scanning unit 110. Additionally, the magnetic field strengths of the first magnetic surface 112 and the second magnetic surface 114 received by the magnetic sensing unit 120 are the same in the present embodiment, but is not limited thereto. In other embodiments, the magnetic field strengths of the first magnetic surface 112 and the second magnetic field strength 114 can be the smallest value of the magnetic field strength emitted by the magnetic scanning unit 110, or other specific values. It should be understood, that the present embodiment is only an example and is not intended to limit the present disclosure.

In the present embodiment, the first rotation axis L1 and the second rotation L2 intersect. Specifically, The first rotation axis L1 and the second rotation axis L2 can be perpendicular to each other, but are not limited thereto. Therefore, the first magnetic surface 112 and the second magnetic surface 114 can rotatably form a detection space 100a. Namely, the detection space 100a is a region of overlap of a space formed by the rotation of the first magnetic surface 112 about the first rotation axis L1 and a space formed by the rotation of the second magnetic surface 114 about the second rotation axis L2. In the present embodiment, the detection space 100a can be spherical, but is not limited thereto.

The magnetic sensing unit 120 is disposed in the detection space 100a, for connecting to a sample and recording a first time point when contacting the first magnetic surface 112 and a second time point when contacting the second magnetic surface 114, thereby respectively obtaining a first-angle data θ and a second-angle data φ, and defining the location data (x, y, z) of the magnetic sensing unit 120 in the detection space 100a with respect to the magnetic scanning unit 110, wherein the first time point does not have to equal the second time point. Namely, the magnetic sensing unit 120 can contact the first magnetic surface 112 and the second magnetic surface 114 at different times, but is not limited thereto. For example, the sample can be mobile device, such as a cell phone, and the magnetic sensing unit 120 can be disposed on the mobile device. By defining the location data (x, y, z) of the magnetic sensing unit 120 with respect to the magnetic scanning unit 110, the location data (x, y, z) of the sample with respect to the magnetic scanning unit 110 can be obtained, thereby accurately determining the position of the sample in the detection space 100a.

Specifically, in the present embodiment, since the magnetic scanning unit 110 can emit a magnetic field of a particular shape, when the magnetic scanning unit 110 rotates about the first rotation axis L1 or the second rotation axis L2 at equal speed, the magnetic field strength detected by the magnetic sensing unit 120 changes according to a regular pattern. Therefore, after completely recording the magnetic field strength detected when the magnetic sensing unit 120 rotates about the first rotation axis L1 and the second rotation axis L2 and corresponding the relative relationship of the angles of rotations of the magnetic sensing unit 120 about the first rotation axis L1 and the second rotation axis L2, the magnetic sensing unit 120 can obtain the angles of rotation of the magnetic sensing unit 120 about the first rotation axis L1 and the second rotation axis L2 according to the detected magnetic field strength. Namely, when the magnetic sensing unit 120 detects magnetic field strengths of value equal to magnetic field strength values of the first magnetic surface 112 or the second magnetic surface 114, the first-angle data θ relating to rotation about the first rotation axis L1 or the second-angle data φ relating to rotation about the second rotation axis L2 can be defined.

For example, the first magnetic surface 112 and the second magnetic surface 114 can be magnetic surfaces formed by the greatest value of the magnetic field strength in the magnetic field formed by the magnetic scanning unit 110. When the first magnetic surface 112 rotate about the first rotation axis L1 (for example the first rotation axis L1 can be parallel to a z axis in the space) from a reference point (for example the first magnetic surface 112 can be parallel to the y-z plane or the x-z plane in the space) and a magnetic field strength detected by the magnetic sensing unit 120 is the greatest value of magnetic field strength emitted by the magnetic scanning unit 110, the magnetic sensing unit 120 can record the first time point, and the first-angle data θ can be defined according to the rotation speed of the first rotation axis L1 and the first time point (e.g. the first-angle data θ can be an included angle on the x-y plane). When the second magnetic surface 112 rotate about the second rotation axis L1 (for example the second rotation axis L1 can be parallel to an x axis or a y axis in the space) from a reference point (for example the first magnetic surface 112 can be parallel to the x-y plane in the space) and a magnetic field strength detected by the magnetic sensing unit 120 is the greatest value of magnetic field strength emitted by the magnetic scanning unit 110, the magnetic sensing unit 120 can record the second time point, and the second-angle data φ can be defined according to the rotation speed of the second rotation axis L2 and the second time point (e.g. the first-angle data θ can be an included angle on the z axis). Namely, the magnetic sensing unit 120 can first record detected changes in the magnetic field strength of the magnetic field emitted by the magnetic scanning unit 110, and obtain a time point when the magnetic sensing unit 120 detects a particular magnetic field strength, and according to the rotation speed of the first rotation axis L1 or the second rotation axis L2, obtain a corresponding value of the angle of rotation of the first rotation axis L1 or the second rotation axis L2. It should be understood, that the first rotation axis L1 and the second rotation axis L2 can rotate at the same speed, but are not limited thereto.

Therefore, after the magnetic sensing unit 120 defines the first-angle data θ and the second-angle data φ, the location data (x, y, z) of the magnetic sensing unit 120 with respect to the magnetic scanning unit 110 in the detection space 100a can be obtained by the following formulas, wherein the location data of the magnetic scanning unit 110 is (0, 0, 0):

$$B_x = \frac{\mu_0 iR}{4\pi} \cdot \int_0^{2\pi} \frac{z\cos\theta \, d\varphi}{[x^2 + z^2 + R^2 - 2Rx\cos\varphi]^{3/2}}$$

$$B_y = \frac{\mu_0 iR}{4\pi} \cdot \int_0^{2\pi} \frac{z\sin\theta \, d\varphi}{[x^2 + z^2 + R^2 - 2Rx\cos\varphi]^{3/2}}$$

$$B_z = \frac{\mu_0 iR}{4\pi} \cdot \int_0^{2\pi} \frac{(R - x\cos\theta) d\varphi}{[x^2 + z^2 + R^2 - 2Rx\cos\varphi]^{3/2}}$$

It should be understood, that the magnetic scanning unit 110 can be set as a reference point, namely having coordinates (0, 0, 0) on the x axis, the y axis and the z axis in the space. i is the current in the coil, $\mu_0$ is a constant (magnetic coefficient), Bx is the magnetic flux density on the x axis, By is the magnetic flux density on the y axis, Bz is the magnetic flux density on the z axis, R is the radius of rotation of the first magnetic surface 112 and the second magnetic surface 114 (when the magnetic scanning unit 110 is a coil surrounding the detection space 110a, radius R is the radius of the coil). Since Bx, By, Bz, i, $\mu_0$ are known values, after calculating the values of (x, y, z) in the above formulas, the location data of the magnetic sensing unit 120 with respect to the magnetic scanning unit 110 in the detection space 100a can be obtained. It should be understood that the present embodiment is an example only and is not intended to limit the present disclosure.

Additionally, in the present embodiment, the magnetic scanning unit 110 can form the second magnetic surface 114 after the magnetic sensing unit 120 defines the first-angle data θ. Namely, after the magnetic scanning unit 110 rotates about the first rotation axis L1 such that the magnetic sensing unit 120 defines the first-angle data θ, the magnetic scanning unit 110 rotates about the second rotation axis L2 such that the magnetic sensing unit 120 defines the second-angle data φ. Therefore, after the magnetic scanning unit 110 defines the first-angle data θ and the second-angle data φ, by calculating with a processor device (e.g. computer or processor), the location data (x, y, z) of the magnetic sensing unit 120 with respect to the magnetic scanning unit 110 in the detection space 100a is obtained, which is also the location data (x, y, z) of the sample connected to the magnetic sensing unit 120 with respect to the magnetic scanning unit 110.

Figure 1C:
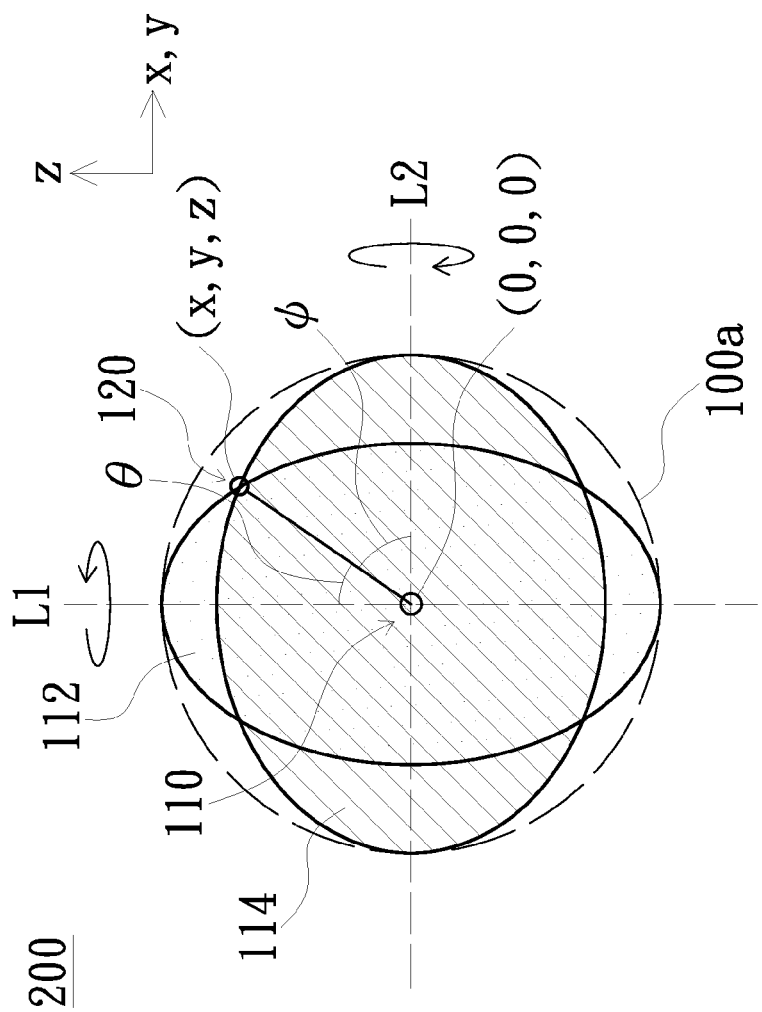
FIG. 1C shows a schematic diagram of a magnetic positioning device according to another embodiment of the present disclosure.

FIG. 1C shows a schematic diagram of a magnetic positioning device according to another embodiment of the present disclosure. It should be understood, that the magnetic positioning device 200 of the present embodiment is substantially the same as the magnetic positioning device 100 of FIG. 1A and FIG. 1B. The main difference lies in that, in the present embodiment, the first rotation axis L1 and the second rotation axis L2 can rotate at the same time such that the first magnetic surface 112 and the second magnetic surface 114 rotate at the same time for the magnetic sensing unit 120 to detect. For example, the magnetic scanning unit 110 can be formed by two rotating magnets having two different rotation axis, but is not limited thereto. It should be understood, the rotation speeds of the first rotation axis L1 and the second rotation axis L2 of the present embodiment are different, such that the magnetic sensing unit 120 can detect two different types of changes in the magnetic field. By recording the abovementioned changes in the magnetic field, the first-angle data θ and the second-angle data φ corresponding to the first time point and the second time point of contacts of the first magnetic surface 112 and the second magnetic surface 114 to the magnetic sensing unit 120 can be obtained. It should be understood that, when the rotation speeds of the first rotation axis L1 and the second rotation axis L2 are different, the magnetic scanning unit 110, the first magnetic surface 112 and the second magnetic surface 114 can contact the magnetic sensing unit 120 at the same time, and through a complete recording of changes in the magnetic field, the first-angle data θ and the second-angle data φ can be obtained.

Figure 2:
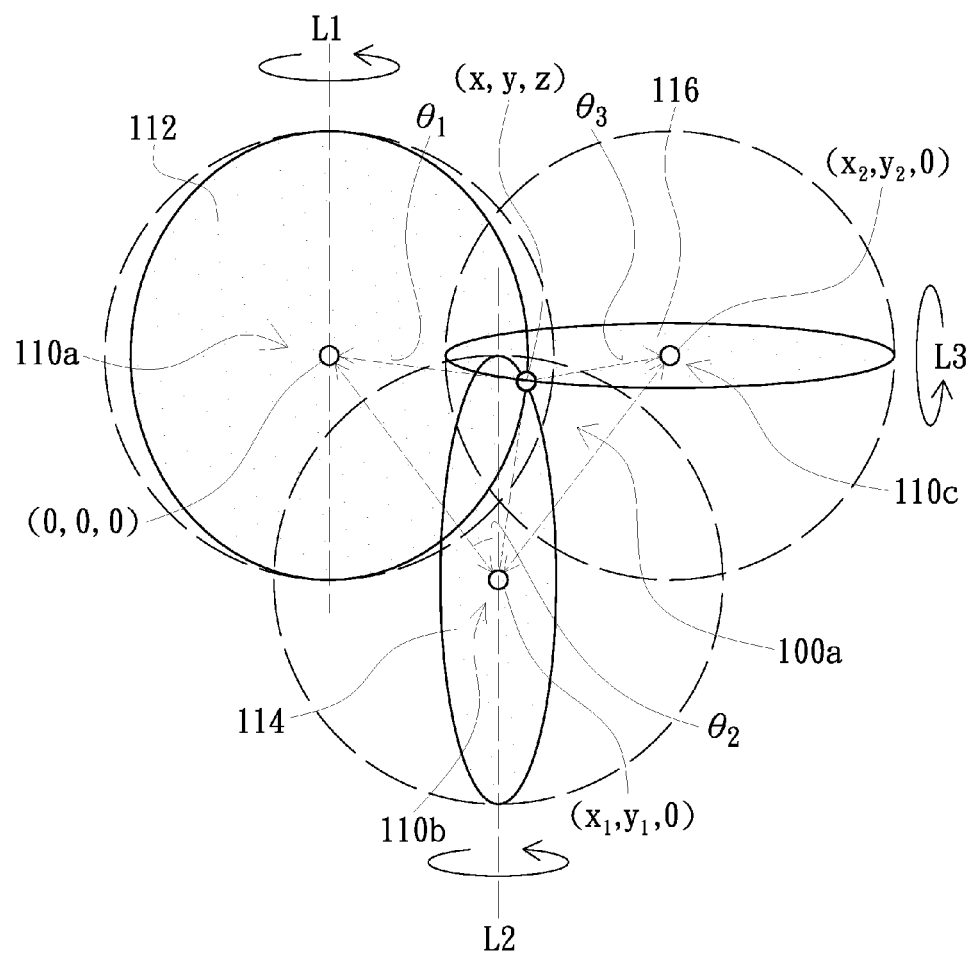
FIG. 2 shows a schematic diagram of a magnetic positioning device according to yet another embodiment of the present disclosure.

FIG. 2 shows a schematic diagram of a magnetic positioning device according to yet another embodiment of the present disclosure. As shown in FIG. 2, a magnetic positioning device 300 of the present embodiment includes a first magnetic scanning unit 110a, a second magnetic scanning unit 110b, a third magnetic scanning unit 110c and a magnetic sensing unit 120.

The first magnetic scanning unit 110a is for forming a first magnetic surface 112. The first magnetic surface 112 rotates about a first rotation axis L1. The second magnetic scanning unit 110b is for forming a second magnetic surface 114. The second magnetic surface 114 rotates about a second rotation axis L2. The third magnetic scanning unit 110c is for forming a third magnetic surface 116. The third magnetic surface 116 rotates about a third rotation axis L3. Rotations of the first magnetic surface 112, the second magnetic surface 114 and the third magnetic surface 116 form a detection space 100a. In the present embodiment, at least two of the first rotation axis L1, the second rotation axis L2 and the third rotation axis L3 are not parallel. For example, the first rotation axis L1 and the second rotation axis L2 are not parallel, but the first rotation axis L1 and the second rotation axis L2 are each perpendicular to the third rotation axis L3 and are not parallel. The detection space 100a is a region of overlap of rotations of the first magnetic surface 112, the second magnetic surface 114 and the third magnetic surface 116. Additionally, in the present embodiment, at least one of the first magnetic scanning unit 110a, the second magnetic scanning 110b and the third magnetic scanning unit 110c is a rotating magnet or biaxial orthogonal coil.

From teachings of FIG. 1A to FIG. 1C, it can be understood that magnetic field strengths of the first magnetic surface 112, the second magnetic surface 114 and the third magnetic surface 116 are respectively greatest values of magnetic field strengths emitted by the first magnetic scanning unit 110a, the second magnetic scanning unit 110b and the third magnetic scanning unit 110c, but are not limited thereto.

The magnetic sensing unit 120 is disposed in the detection space 100a for connecting to a sample, and records a first time point, a second time point and a third time point when contacting respectively the first magnetic surface 112, the second magnetic surface 114 and the third magnetic surface 116, thereby obtaining a first-angle data θ1, a second-angle data θ2 and a third-angle data θ3, and defining a location data (x, y, z) of the magnetic sensing unit 120 in the detection space 100a with respect to the first magnetic scanning unit 110a, the second magnetic scanning unit 110b, and the third magnetic scanning unit 110c. Namely, when the first-angle data θ1, the second-angle data θ2 and the third-angle data θ3 are known, by calculating with a processor device (e.g. computer or processor) and a three-point positioning method, the data location (x, y, z) of the magnetic sensing unit 120 in the detection space 100a with respect to the magnetic scanning units are obtained, which is also a location data (x, y, z) of the sample connected to the magnetic sensing unit 120 with respect to the magnetic scanning units. It should be understood, that the location data of the first magnetic scanning unit 110a can be set as the origin (0, 0, 0) and inferentially obtain the location data of the second magnetic scanning unit 110b to be (x1, y1, 0) and the location data of the third magnetic unit 110c to be (x2, y2, 0). Namely, the first magnetic scanning unit 110a, the second magnetic scanning unit 110b and the third magnetic scanning unit 110c of the present embodiment can be on the same plane.

It should be understood that in some embodiments, the second magnetic scanning unit 110b is for forming the sample-existing second magnetic surface 114 after the magnetic sensing unit 120 defines the first-angle data θ1, and the third magnetic scanning unit 110c is for forming the sample-existing third magnetic surface 116 after the magnetic sensing unit 120 defines the second-angle data θ2. Additionally, in other embodiments, the first magnetic scanning unit 110a, the second magnetic scanning unit 110b and the third magnetic scanning unit 110c can rotate at the same time. For example, the rotation speeds (time changing scanning frequencies) of the first magnetic surface 112, the second magnetic surface 114 and the third magnetic surface 116 are different. Namely, in the present embodiment, the first rotation axis L1, the second rotation axis L2 and the third rotation axis L3 can rotate at the same time such that the first magnetic surface 112, the second magnetic surface 114 and the third magnetic surface 116 can rotate at the same time to be detected by the magnetic sensing unit 120. It should be understood, that the rotation speeds of the first rotation axis L1, the second rotation axis L2 and the third rotation axis L3 of the present embodiment are different, such that the magnetic sensing unit 120 can detect three different changes in the magnetic field, and by recording the abovementioned changes of the magnetic field, the first-angle data θ1, the second-angle data θ2 and the third-angle data θ3 corresponding to the first time point, the second time point and the third time point of contacts of the first magnetic surface 112, the second magnetic surface 114 and the third magnetic surface 116 to the magnetic sensing unit 120 can be obtained.

In this embodiment, there is a frequency domain group delay and each one frequency can show a specific timing, and thus we can also use a frequency domain group delay analysis to calculate the time difference.

As disclosed in the abovementioned embodiments, the present disclosure has the following advantages. The magnetic positioning device of the present embodiment can use the magnetic scanning unit to construct a detection space, and a magnetic sensing unit can be disposed on a sample in the detection space. By detecting and analyzing magnetic faces formed by the magnetic field emitted by the magnetic scanning unit, the magnetic sensing unit can define the location relationship of the sample in the detection space. Since the magnetic positioning device of the present embodiment can detect and define the position of the sample in the detection space by detecting the magnetic field strength of the magnetic field, the magnetic positioning device of the present embodiment has higher accuracy compared to typical wireless positioning methods.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic positioning device comprising:
a magnetic scanning unit, for forming a first magnetic surface and a second magnetic surface, wherein the first magnetic surface rotates about a first rotation axis, the second magnetic surface rotates about a second rotation axis, the first rotation axis and the second rotation axis intersect, and rotations of the first magnetic surface and the second magnetic surface form a detection space; and
a magnetic sensing unit, disposed in the detection space for connecting to a sample and for recording a first time point when contacting the first magnetic surface and a second time point when contacting the second magnetic surface, defining a first-angle data and a second-angle data, and defining a location data of the magnetic sensing unit in the detection space with respect to the magnetic scanning unit.

2. The magnetic positioning device according to claim 1, wherein the first magnetic surface has a first scanning radius, the second magnetic surface has a second scanning radius, the magnetic sensing unit defines the location data according to the first-angle data, the second-angle data, the first scanning radius, the second scanning radius and magnetic field strengths of the first magnetic surface and the second magnetic surface.

3. The magnetic positioning device according to claim 2, wherein the first scanning radius is equal to the second scanning radius.

4. The magnetic positioning device according to claim 1, wherein the first rotation shaft and the second rotation shaft are perpendicular.

5. The magnetic positioning device according to claim 1, wherein magnetic field strengths of the first magnetic surface and the second magnetic surface are greatest values of a magnetic field strength emitted by the magnetic scanning unit.

6. The magnetic positioning device according to claim 1, wherein the magnetic scanning unit is for forming the second magnetic surface after the magnetic sensing unit defines the fist-angle data.

7. The magnetic positioning device according to claim 1, wherein when the first magnetic surface rotates and a magnetic field strength detected by the magnetic sensing unit is a greatest value of a magnetic field strength emitted by the magnetic scanning unit, the magnetic sensing unit records the first time point, when the second magnetic surface rotates and a magnetic field strength detected by the magnetic sensing unit is a greatest value of a magnetic field strength emitted by the magnetic scanning unit, the magnetic sensing unit records the second time point, and the first-angle data and the second-angle data are defined according to the first time point and the second time point, respectively.

8. The magnetic positioning device according to claim 1, wherein rotation speeds of the first magnetic surface and the second magnetic surface are different.

9. The magnetic positioning device according to claim 1, wherein the magnetic scanning unit is a rotating magnet or a biaxial orthogonal coil.

10. A magnetic positioning device comprising:
a first magnetic scanning unit, for forming a first magnetic surface rotatable about a first rotation axis;
a second magnetic scanning unit, for forming a second magnetic surface rotatable about a second rotation axis;
a third magnetic scanning unit, for forming a third magnetic surface rotatable about a third rotation axis, wherein rotations of the first magnetic surface, the second magnetic surface and the third magnetic surface form a detection space; and
a magnetic sensing unit, disposed in the detection space for connecting to a sample and for recording a first time point, a second time point and a third time point when contacting respectively the first magnetic surface, the second magnetic surface and the third magnetic surface, defining a first-angle data, a second-angle data and a third-angle data, and defining a location data of the magnetic sensing unit in the detection space with respect to the first magnetic scanning unit, the second magnetic sensing unit and the third magnetic sensing unit.

11. The magnetic positioning device according to claim 10, wherein at least two of the first rotation shaft, the second rotation shaft and the third rotation shaft are not parallel.

12. The magnetic positioning device according to claim 10, wherein magnetic field strengths of the first magnetic surface, the second magnetic surface and the third magnetic surface are greatest values of magnetic field strengths emitted by the first magnetic scanning unit, the second magnetic scanning unit and the third magnetic scanning unit, respectively.

13. The magnetic positioning device according to claim 10, wherein the second magnetic scanning unit is for forming the second magnetic surface after the magnetic sensing unit defines the first-angle data, and the third magnetic scanning unit is for forming the third magnetic surface after the magnetic sensing unit defines the second-angle data.

14. The magnetic positioning device according to claim 10, wherein rotation speeds of the first magnetic surface, the second magnetic surface and the third magnetic surface are different.

15. The magnetic positioning device according to claim 10, wherein the detection space is a region of overlap of rotations of the first magnetic surface, the second magnetic surface and the third magnetic surface.

16. The magnetic positioning device according to claim 10, wherein at least one of the first magnetic scanning unit, the second magnetic scanning unit and the third magnetic scanning unit is a rotating magnet or a biaxial orthogonal coil.

* * * * *